(12) United States Patent
Kondo et al.

(10) Patent No.: US 9,876,981 B2
(45) Date of Patent: Jan. 23, 2018

(54) OPERATIONAL TERMINAL DEVICE, DISPLAY CONTROL DEVICE, METHOD OF OPERATING TERMINAL DEVICE, METHOD OF OPERATING DISPLAY CONTROL DEVICE, AND SYSTEM

(71) Applicant: Saturn Licensing LLC, New York, NY (US)

(72) Inventors: Kazumoto Kondo, Kanagawa (JP); Yasuhisa Nakajima, Kanagawa (JP); Takashi Tsurumoto, Saitama (JP); Masahiro Nakano, Tokyo (JP); Shiro Omori, Kanagawa (JP); Tatsushi Banba, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/326,947

(22) Filed: Jul. 9, 2014

(65) Prior Publication Data

US 2014/0320751 A1 Oct. 30, 2014

Related U.S. Application Data

(63) Continuation of application No. 13/273,462, filed on Oct. 14, 2011, now Pat. No. 8,803,811.

(30) Foreign Application Priority Data

Oct. 22, 2010 (JP) ................ P2010-237667

(51) Int. Cl.
*H04N 5/44* (2011.01)
*H04N 5/445* (2011.01)
*H04N 21/422* (2011.01)

(52) U.S. Cl.
CPC ....... *H04N 5/4403* (2013.01); *H04N 5/44582* (2013.01); *H04N 21/42224* (2013.01);
(Continued)

(58) Field of Classification Search
CPC ......... H04N 5/44582; H04N 21/42224; H04N 21/42227; H04N 2005/443; H04N 2005/4408; H04N 5/4403
See application file for complete search history.

(56) References Cited

U.S. PATENT DOCUMENTS 6,133,847 A 10/2000 Yang
6,791,467 B1 9/2004 Ben-Ze'ev
(Continued)

FOREIGN PATENT DOCUMENTS

CN 1336768 A 2/2002
CN 1620121 A 5/2005
(Continued)

OTHER PUBLICATIONS

European Search Report EP 11185252, dated Jan. 31, 2012.
(Continued)

*Primary Examiner* — Abbas Abdulselam
(74) *Attorney, Agent, or Firm* — Lerner, David, Littenberg, Krumholz & Mentlik, LLP

(57) ABSTRACT

An operational terminal device may include a control unit to control display on a display screen of at least one operation button to control a display control device, based on button information associated with the operation button and received from the display control device.

21 Claims, 14 Drawing Sheets

(52) U.S. Cl.
CPC . *H04N 21/42227* (2013.01); *H04N 2005/443* (2013.01); *H04N 2005/4408* (2013.01); *H04N 2005/4423* (2013.01); *H04N 2005/4425* (2013.01)

(56) References Cited

U.S. PATENT DOCUMENTS

| | | | |
|---|---|---|---|
| 7,091,898 B2* | 8/2006 | Arling et al. | 341/176 |
| 7,345,593 B2 | 3/2008 | Park et al. | |
| 7,363,028 B2 | 4/2008 | de Clerq et al. | |
| 7,535,516 B2 | 5/2009 | Kunita | |
| 7,894,860 B2* | 2/2011 | Moon et al. | 455/566 |
| 8,037,493 B2 | 10/2011 | Migos | |
| 8,054,294 B2 | 11/2011 | Sakai et al. | |
| 8,056,117 B2 | 11/2011 | Jung et al. | |
| 8,091,042 B2* | 1/2012 | Chen et al. | G06F 9/4443 715/817 |
| 8,499,243 B2* | 7/2013 | Yuki | 715/735 |
| 8,769,578 B2* | 7/2014 | Lau et al. | 725/42 |
| 2001/0017615 A1 | 8/2001 | Lin et al. | |
| 2001/0035860 A1 | 11/2001 | Segal et al. | |
| 2002/0054028 A1 | 5/2002 | Uchida et al. | |
| 2003/0063073 A1 | 4/2003 | Geaghan et al. | |
| 2003/0103088 A1 | 6/2003 | Dresti et al. | |
| 2004/0056848 A1 | 3/2004 | Sasaki | |
| 2004/0056892 A1 | 3/2004 | Honda et al. | |
| 2004/0070491 A1 | 4/2004 | Huang et al. | |
| 2004/0073926 A1 | 4/2004 | Nakamura et al. | |
| 2005/0184968 A1 | 8/2005 | Uchida et al. | |
| 2006/0101338 A1 | 5/2006 | Kates | |
| 2007/0080845 A1 | 4/2007 | Amand | |
| 2007/0217650 A1 | 9/2007 | Ota et al. | |
| 2009/0318075 A1 | 12/2009 | Kwon et al. | |
| 2009/0320070 A1 | 12/2009 | Inoguchi | |
| 2010/0233632 A1 | 9/2010 | Kawazu et al. | |
| 2010/0238130 A1 | 9/2010 | Lin et al. | |
| 2011/0007018 A1 | 1/2011 | McKinley et al. | |
| 2012/0098771 A1 | 4/2012 | Kondo et al. | |

FOREIGN PATENT DOCUMENTS

| | | | |
|---|---|---|---|
| CN | 101057208 A | 10/2007 | |
| CN | 101496404 A | 7/2009 | |
| JP | H07336778 A | 12/1995 | |
| JP | H11502070 A | 2/1999 | |
| JP | 2001045322 A | 2/2001 | |
| JP | 2001-242995 A | 9/2001 | |
| JP | 2001245371 A | 9/2001 | |
| JP | 2005073022 A | 3/2005 | |
| JP | 2005136518 A | 5/2005 | |
| JP | 2005217473 A | 8/2005 | |
| JP | 2005277473 A | 10/2005 | |
| JP | 2006262094 A | 9/2006 | |
| JP | 2006319539 A | 11/2006 | |
| JP | 2007089012 A | 4/2007 | |
| JP | 2007104161 A | 4/2007 | |
| JP | 2007129331 A | 5/2007 | |
| JP | 2007325019 A | 12/2007 | |
| JP | 2008-153732 A | 7/2008 | |
| JP | 2008288638 A | 11/2008 | |
| JP | 2008305274 A | 12/2008 | |
| JP | 2010114586 A | 5/2010 | |
| JP | 2010183438 A | 8/2010 | |
| JP | 2010237667 A | 10/2010 | |

OTHER PUBLICATIONS

Overview of B-XML/BML Draft Specification Developed by Arib, Oct. 1, 1999 (Oct. 1, 1999), XP 55017353, Retrieved from the Internet: URL:http://lists.w3.org/Archives/Public/www-tv/1999OctDec/att-0031/02-BML-BXML-Abst3.doc.
Office Action from Japanese Application No. 2010-237667, dated Apr. 17, 2014.
Japanese Office Action for JP Application No. 2010237667, dated Dec. 4, 2014.
Chinese Office Action for CN Application No. 201110322445.8, dated Oct. 28, 2015.
CN OA for Application No. 201110322445.8 dated Oct. 28, 2015.
CN Second OA for Application No. 201110322445.8 dated Jun. 17, 2016.
CN Third OA for Application No. 201110322445.8 dated Nov. 11, 2016.
EP OA for Application No. 11185252.1 dated Nov. 25, 2015.
EP OA for Application No. 11185252.1 dated Oct. 1, 2014.
EP Summons to Attend Oral Proceedings for Application No. 11185252.1 dated Nov. 2, 2016.
JP Notice of Allowance for Application No. 2010237667 dated Jul. 5, 2015.
JP OA for Application No. 2010237667 dated Apr. 17, 2014.
JP Search Report for Application No. 2010237667 dated Apr. 15, 2014.
Rejection Decision for Application No. CN201110322445.8 dated Jun. 19, 2017.

\* cited by examiner

```
<?xml version='1.0' encoding='UTF-8' ?>
<command>
    <blue>                  ,--L
        <label>(NEWS)</label>
    </blue>
    <red>                          ,--L
        <label>(LOCAL WEATHER)</label>
    </red>
    <green>              ,--L
        <label>(SPORTS)</label>
    </green>
    <yellow>                     ,--L
        <label>(YEN AND STOCKS)</label>
    </yellow>
</command>
```

FIG. 7

```
<?xml version='1.0' encoding='UTF-8'?>
<command>
    <extended_menu>
        <button>
            <functino>link_menu</function>
            <label>(LINK MENU)</function>
        </button>                    L
                                                                        } W1

<group_menu><label>RECORDER</label>

<button>
            <functino>replay</function>
            <label>(REPLAY)</label>
        </button>             L
                                                                        } W2

<button>
            <functino>record</function>
            <label>(RECORD)</label>
        </button>             L
                                                                        } W3

<button>
            <functino>program recording</function>
            <label>(PROGRAM RECORDING)</label>
        </button>                              L
                                                                        } W4

<button>
            <functino>play</function>
            <label>(PLAY)</label>
        </button>          L
                                                                        } W5

</group_menu>
    </extended_menu>
</command>
```

FIG. 12

OPERATIONAL TERMINAL DEVICE, DISPLAY CONTROL DEVICE, METHOD OF OPERATING TERMINAL DEVICE, METHOD OF OPERATING DISPLAY CONTROL DEVICE, AND SYSTEM

CROSS-REFERENCE TO RELATED APPLICATIONS

This application is a continuation of U.S. patent application Ser. No. 13/273,462, filed on Oct. 14, 2011, which contains subject matter related to that disclosed in Japanese Priority Patent Application 2010-237667 filed in the Japan Patent Office on Oct. 22, 2010, the entire content of which is hereby incorporated by reference.

BACKGROUND

The present technology relates to an operational terminal device, a display control device operated by the operational terminal device, a method of operating a terminal device, a method of operating a display control device, and a system.

Remote controls are essential for a large number of electronic units including televisions and recording/playback devices such as BD (Blu-ray Disc (registered trademark)) recorders. Remote controls including only operation buttons have been dominant; however, in recent years, remote controls including a display panel and a touch panel have been developed. For example, in Japanese Unexamined Patent Application Publication No. 2008-153732 discloses a remote control device displaying, on a display panel, operation buttons similar to those in a typical remote control on a display panel in a normal mode and displaying, on the display panel, the same menu screen as that displayed on a television screen by pushing a menu button, thereby performing operations with a touch panel.

In some cases, a remote control is operated according to an instruction displayed on a display device. For example, with the spread of digital broadcasting in recent years, televisions are provided with remote controls including blue, red, green and yellow buttons (hereinafter referred to as color buttons), and these color buttons are operated while watching information displayed on the television, thereby allowing various operations to be performed depending on the situation. More specifically, for example, the case where data broadcasting is displayed on a television to operate color buttons according to an instruction on a display screen and the case where a recording/playback device is programmed with use of color buttons according to an instruction on a display screen of a television correspond to the above case.

However, in such a situation, it is necessary for a user to operate a remote control in his hand while watching a display screen of a television to check an instruction, and the user frequently suffers inconvenience. Japanese Unexamined Patent Application Publication No. 2008-153732 does not disclose a method of eliminating this inconvenience in the case where operation buttons are displayed on the remote control.

It is desirable to provide an operational terminal device capable of reducing the frequency with which a user watches a display screen of a display device when operating operation buttons on a remote control, a display control device, a method of operating a terminal device, a method of operating a display control device, and a system.

SUMMARY

In accordance with one embodiment, an operational terminal device may include a control unit to control display on a display screen of at least one operation button to control a display control device, based on button information associated with the operation button and received from the display control device.

In accordance with another embodiment, a display control device may include a control unit to control transmission, to an external device that controls display on a display screen, of button information associated with at least one operation button, where the button information controls display of the operation button on the display screen by the external device.

In accordance with another embodiment, a method of operating a terminal device may include controlling, by a processor, display on a display screen of at least one operation button to control a display control device, based on button information associated with the operation button and received from the display control device.

In accordance with another embodiment, a method of operating a display control device may include controlling, by a processor, transmission, to an external device that controls display on a display screen, of button information associated with at least one operation button, where the button information controls display of the operation button on the display screen by the external device.

In accordance with another embodiment, a system may include an operational terminal device and a display control device. The operational terminal device may include a first control unit to control display on a display screen of at least one operation button to control the display control device, based on button information associated with the operation button and received from the display control device. The display control device may include a second control unit to control transmission to the terminal device of the button information.

In the operational terminal device, the display control device, the method of operating a terminal device, the method of operating a display control device, and the system according to the embodiment of the technology, display control of the operation buttons on the operational terminal device is performed based on the button information transmitted from the display control device; therefore, the frequency with which a user watches a display screen of the display control device when operating the operation buttons is allowed to be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 7 is a diagram illustrating an example of a display control command.

FIG. 12 is a diagram illustrating another example of the display control command.

DETAILED DESCRIPTION OF THE PREFERRED EMBODIMENTS

Preferred embodiments of the technology will be described in detail below referring to the accompanying drawings. It is to be noted that description will be given in the following order.

1. First Embodiment
2. Second Embodiment (1. First Embodiment)
[Configuration Example]
(Whole Configuration Example)

Figure 1:
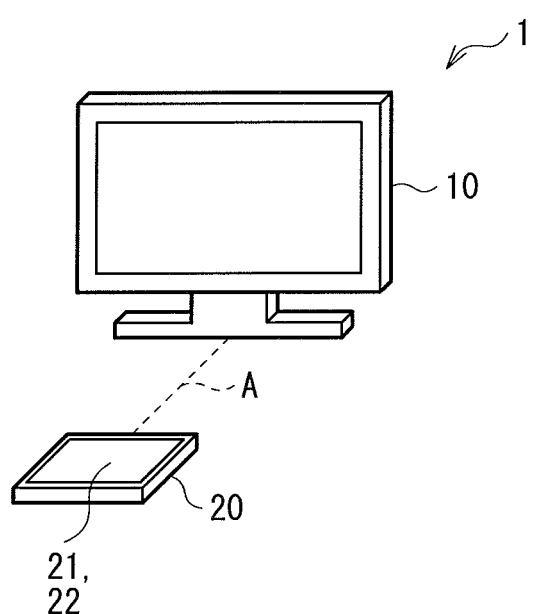
FIG. 1 is a configuration diagram illustrating a configuration example of a display system according to a first embodiment of the technology.

FIG. 1 illustrates a configuration example of a display system according to an embodiment of the technology. It is to be noted that an operational terminal device, a display control device, a method of operating a terminal device, a method of operating a display control device, and a system according to an embodiment of the technology are embodied by the embodiment, and will be also described below.

A display system 1 includes a display device 10 and a mobile device 20. In this example, as will be described later, the display device 10 is a display device displaying television broadcasting received through an antenna. The mobile device 20 is an electronic device such as a cellular phone, a PDA (Personal Digital Assistant) or a portable music player, and includes a display section 21 and a touch panel 22. The mobile device 20 has a remote control mode for operating the display device 10, and when the mobile device 20 is switched to the remote control mode, operation buttons of a remote control are displayed on the display section 21, and the display device 10 is allowed to be operated by touching any one of the operation buttons by a user. The display device 10 and the mobile device 20 have a communication mechanism A allowing information to be exchanged therebetween. In the case where the mobile device 20 is in the remote control mode, the mobile device 20 transmits a remote control signal R to the display device 10 through the communication mechanism A. Moreover, as will be described later, the display device 10 transmits, to the mobile device 20, information associated with operation buttons displayable on the display section 21 of the mobile device 20 through the communication mechanism A. For example, as the communication mechanism A, wireless communication such as wireless LAN (Local Area Network), ZigBee (registered trademark) or Bluetooth (registered trademark) is allowed to be used. It is to be noted that the communication mechanism A between the display device 10 and the mobile device 20 in this example is wireless communication; however, the communication mechanism A is not limited thereto, and may be wired communication such as LAN or USB (Universal Serial Bus).

Figure 2:
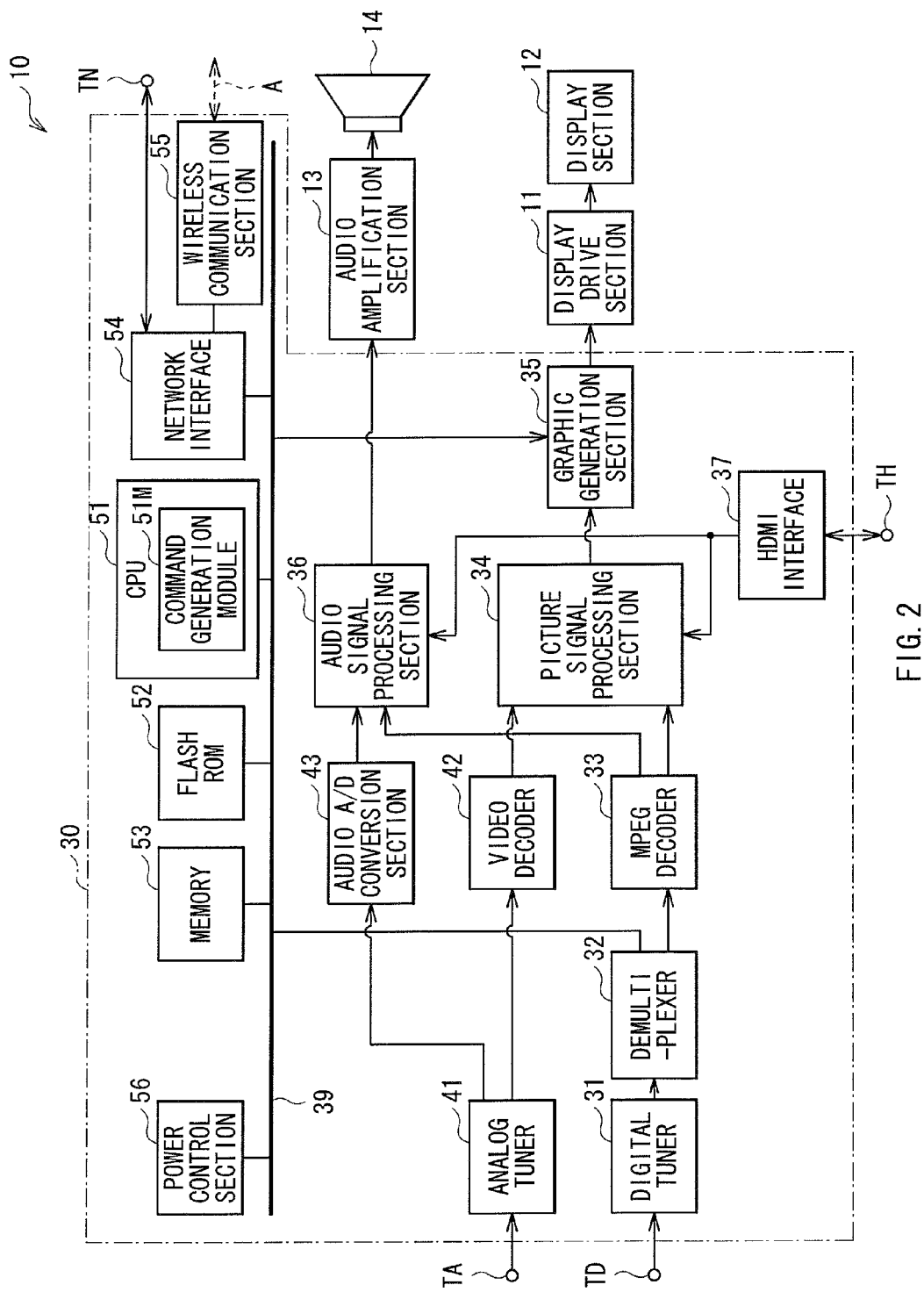
FIG. 2 is a block diagram illustrating a configuration example of a display illustrated in FIG. 1.

FIG. 2 illustrates a configuration example of the display device 10. The display device 10 includes a signal processing section 30, a display drive section 11, a display section 12, an audio amplification section 13 and a speaker 14.

The signal processing section 30 includes a digital tuner 31, a demultiplexer 32, an MPEG (Moving Picture Experts Group) decoder 33, a picture signal processing section 34, a graphic generation section 35, an audio signal processing section 36 and an HDMI (High-Definition Multimedia Interface) interface 37.

The digital tuner 31 converts a broadcast wave signal of digital terrestrial broadcasting received by an antenna (not illustrated) and supplied through an antenna terminal TD into an MPEG-TS stream. Moreover, the digital tuner 31 may process a broadcast wave signal of BS (Broadcasting Satellite) digital broadcasting or CS (Communications Satellite) digital broadcasting in addition to the broadcast wave signal of digital terrestrial broadcasting. These broadcast wave signals include not only a picture signal and an audio signal but also a data broadcasting signal. Information of data broadcasting is written in BML (Broadcast Markup Language) in this example. The demultiplexer 32 has a function of separating the supplied MPEG-TS stream into the picture signal and the audio signal, and the data broadcasting signal. The MPEG decoder 33 converts the picture signal and the audio signal into a digital component signal and a digital audio signal, respectively, based on the picture signal and audio signal supplied from the demultiplexer 32.

Moreover, the signal processing section 30 includes an analog tuner 41, a video decoder 42 and an audio A/D conversion section 43. The analog tuner 41 demodulates the broadcast wave signal of analog terrestrial broadcasting received by the antenna (not illustrated) and supplied through the antenna terminal TA into a baseband. The video decoder 42 converts the picture signal demodulated by the analog tuner 41 into a digital component signal. The audio A/D conversion section 43 converts an analog audio signal demodulated by the analog tuner 41 into a digital audio signal.

It is to be noted that in this example, as described above, the signal processing section 30 includes the analog tuner 41, the video decoder 42 and the audio A/D conversion section 43, and is allowed to receive analog terrestrial broadcasting; however, the signal processing section 30 is not limited thereto, and a signal processing section not including these components may be used.

The picture signal processing section 34 performs picture signal processing such as gamma processing, YUY-RGB conversion or frame sequential output on the picture signal (the digital component signal) supplied from the MPEG decoder 33 or the video decoder 42. The graphic generation section 35 has a function of generating a screen for displaying data broadcasting, or generating OSD (On Screen Display) information to superimpose the screen or the OSD information on a picture supplied from the picture signal processing section 34.

The audio signal processing section 36 performs audio signal processing such as surround processing on the digital audio signal supplied from the MPEG decoder 33 or the audio A/D conversion section 43.

The HDMI interface 37 has a function of exchanging information with an external device (not illustrated), like a recording/playback device such as a BD recorder, through an HDMI terminal TH. For example, in the case where a picture signal and an audio signal are supplied from a recording/playback device connected to the HDMI interface 37, the HDMI interface 37 supplies the picture signal and the audio signal to the picture signal processing section 34 and the audio signal processing section 36, respectively.

Moreover, the signal processing section 30 includes a CPU (Central Processing Unit) 51, a flash ROM 52, a memory 53, a network interface 54, a wireless communication section 55 and a power control section 56. The CPU 51, the flash ROM 52, the memory 53, the network interface 54 and the power control section 56 are connected to one another through an internal bus 39.

The CPU 51 has a function of controlling the whole display device 10. The flash ROM 52 stores a program necessary for controlling the display device 10, and the CPU 51 reads the program to control the display device 10 with use of the memory 53 as a temporary storage device. The network interface 54 exchanges information with the mobile device 20 by wired communication through the network terminal TN or by the communication mechanism A (wireless communication) through the wireless communication section 55. The power control section 56 has a function of performing ON/OFF control of a power supply of the display device 10.

In the display device 10 with this configuration, when a remote control signal R is transmitted from the mobile device 20, the network interface 54 receives the remote control signal R through the wireless communication section 55, and the CPU 51 analyzes the remote control signal R to control the whole display device 10.

Moreover, in the display system 1, as will be described later, for example, in the case where data broadcasting is displayed on the display device 10, display control of operation buttons on the mobile device 20 is performed based on contents of the data broadcasting. More specifically, first, the graphic generation section 35 generates a display screen for data broadcasting based on information (BML) associated with data broadcasting supplied from the demultiplexer 32 through the internal bus 39, and the display section 12 displays the display screen. At the same time, as will be described later, the CPU 51 executes a command generation module 51M to parse (analyze) the information (BML) associated with data broadcasting, thereby generating a display control command C for performing display control of the operation buttons on the mobile device 20. The display control command C in this example is written in BML. Then, the network interface 54 and the wireless communication section 55 transmits the display control command C to the mobile device 20 through the communication mechanism A, and the mobile device 20 performs display control of the operation buttons according to the display control command C.

The display drive section 11 generates a drive signal for driving the display section 12 based on the picture signal supplied from the graphic generation section 35 of the signal processing section 30. The display section 12 performs display in response to the drive signal supplied from the display drive section 11, and is configured of, for example, a liquid crystal display.

The audio amplification section 13 amplifies the audio signal subjected to audio signal processing in the audio signal processing section 36 of the signal processing section 30. The speaker 14 outputs the audio signal amplified by the audio amplification section 13.

Figure 3:
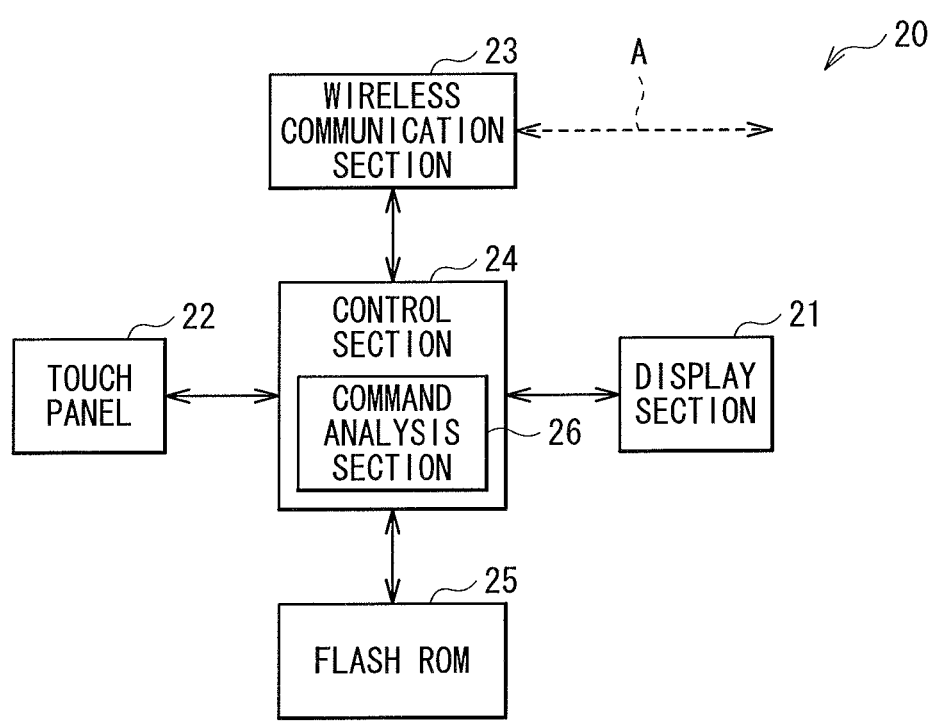
FIG. 3 is a block diagram illustrating a configuration example of a mobile device illustrated in FIG. 1.

FIG. 3 illustrates a configuration example of the mobile device 20. The mobile device 20 includes the display section 21, the touch panel 22, a wireless communication section 23, a control section 24 and a flash ROM 25.

The display section 21 displays a state of the mobile device 20, an instruction to a user, or the like, and is configured of, for example, a liquid crystal display. In a remote control mode, the display section 21 displays operation buttons for operating the display device 10. The touch panel 22 is arranged to be superimposed on the display section 21, and functions as an input interface when a user inputs information according to display of the display section 21. The wireless communication section 23 exchanges information with the display device 10 through the communication mechanism A (wireless communication). The control section 24 controls these components. Moreover, the control section 24 includes a command analysis section 26 which analyzes the display control command C transmitted from the display device 10 to perform display control of the operation buttons on the display section 21. The flash ROM 25 stores a program necessary when the control section 24 performs control.

Figure 4:
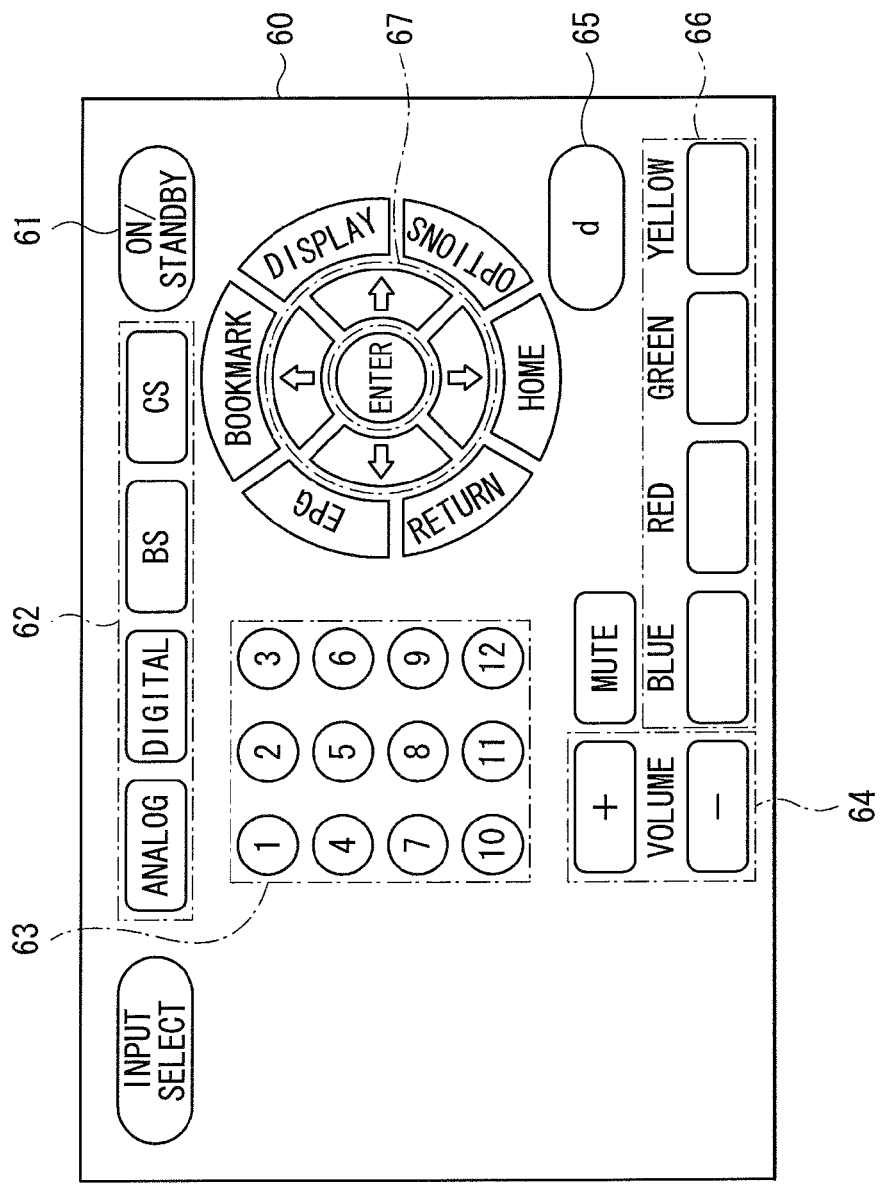
FIG. 4 is a diagram illustrating an example of a display screen of the mobile device illustrated in FIG. 3.

FIG. 4 illustrates an example of a display screen of the mobile device 20 in the remote control mode. In the remote control mode, for example, as illustrated in FIG. 4, the mobile device 20 displays various operation buttons on the display screen 60. Examples of the operation buttons include an on/standby button 61, a broadcast select button section 62, a number button section 63, a volume button section 64, a data broadcasting button 65, a color button section 66 and a cursor button section 67. The on/standby button 61 controls ON/OFF of the power supply of the display device 10. The broadcast select button section 62 is provided to select broadcasting to be received, and in this example, broadcasting to be received is selected from analog terrestrial broadcasting, digital terrestrial broadcasting, BS broadcasting and CS broadcasting. The number button section 63 is provided to switch channels or to input a number. The volume button section 64 is provided to adjust the volume of the display device 10. The data broadcasting button 65 is provided to display or hide data broadcasting in the case where a received broadcast wave signal includes data broadcasting. The color button section 66 is provided to select a function or the like, and, for example, the color button section 66 is used to select a menu in the case where data broadcasting is displayed, or to control the recording/playback device in the case where the recording/playback device is connected to the HDMI terminal TH. For example, the cursor button section 67 is used to move a cursor displayed on the display screen of the display device 10. Moreover, for example, the cursor button section 67 is used to control the recording/playback device in the case where the recording/playback device is connected to the HDMI terminal TH. Thus, for example, various functions are allocated to the color button section 66, the cursor button section 67 and the like depending on situation.

In the remote control mode, the mobile device 20 displays operation buttons as illustrated in FIG. 4 on the display section 21 based on a program stored in the flash ROM 25, and the wireless communication section 23 transmits the remote control signal R to the display device 10 in response to a user's operation. In this example, a program for remote control operation is stored in the flash ROM 25 however, the technology is not limited thereto, and, for example, a whole or a part of the program may be transmitted from the display device 10 when the mobile device 20 is turned on.

Moreover, the mobile device 20 has a function of receiving the display control command C from the display device 10 to perform display control of the operation buttons according to the display control command C. More specifically, the wireless communication section 23 receives the display control command C from the display device 10, and the command analysis section 26 of the control section 24 parses the display control command C to perform display control of the operation buttons on the display section 21.

Herein, the mobile device 20 corresponds to a specific example of "an operational terminal device" in the technology. The on/standby button 61, the broadcast select button section 62, the number button section 63, the volume button section 64, the data broadcasting button 65, the color button section 66 and the cursor button section 67 correspond to specific examples of "operation button" in the technology. The remote control signal R corresponds to a specific example of "a control signal" in the technology. The wireless communication section 23 and the control section 24 (the command analysis section 26) correspond to a specific example of "a control unit" in the operational terminal device according to the technology.

The command generation module 51M, the network interface 54, and the wireless communication section 55 correspond to specific examples of "a control unit" in the display control device according to the technology.

[Operation and Functions]

Next, an operation and functions of the display system 1 according to the embodiment will be described below.

(Summary of Whole Operation)

First, referring to FIGS. 1 to 4, a whole operation of the display system 1 will be briefly described below. In the display device 10, the digital tuner 31 converts a broadcast wave signal including a picture signal, an audio signal and a data broadcasting signal into an MPEG-TS stream. The demultiplexer 32 separates the supplied MPEG-TS stream into the picture signal and the audio signal, and the data broadcasting signal. The MPEG decoder 33 converts the picture signal and the audio signal into a digital component signal and a digital audio signal, respectively, based on the picture signal and the audio signal supplied from the demultiplexer 32. The picture signal processing section 34 performs picture signal processing on the picture signal supplied from the MPEG decoder 33. The graphic generation section 35 generates a screen for displaying data broadcasting or OSD information to superimpose the screen or the OSD information on a picture supplied from the picture signal processing section 34. The display drive section 11 drives the display section 12 based on the picture signal supplied from the graphic generation section 35. The display section 12 performs display in response to a signal supplied from the display drive section 11. The audio signal processing section 36 performs audio signal processing on the audio signal supplied from the MPEG decoder 33. The audio amplification section 13 amplifies the audio signal supplied from the audio signal processing section 36 to drive the speaker 14. The speaker 14 outputs the audio signal as sound.

Moreover, the network interface 54 receives the remote control signal R from the mobile device 20 by the communication mechanism A through the wireless communication section 55. The CPU 51 analyzes the remote control signal R to control the whole display device 10. Further, the command generation module 51M of the CPU 51 parses information associated with data broadcasting supplied from the demultiplexer 32 through the internal bus 39 to generate the display control command C for performing display control of the operation buttons on the mobile device 20. The network interface 54 transmits the display control command C to the mobile device 20 by the communication mechanism A through the wireless communication section 55.

In the mobile device 20, the display section 21 displays operation buttons for operating the display device 10 in the remote control mode. The touch panel 22 receives an information input by a user. The control section 24 generates the remote control signal R in response to a user's operation, and the wireless communication section 23 transmits the remote control signal R to the display device 10 through the communication mechanism A. Moreover, the wireless communication section 23 receives the display control command C from the display device 10. The command analysis section 26 of the control section 24 analyzes the display control command C to perform display control of the operation buttons on the display section 21.

(Specific Operation)

Next, a specific operation of the display system 1 will be described below.

Figure 5A:
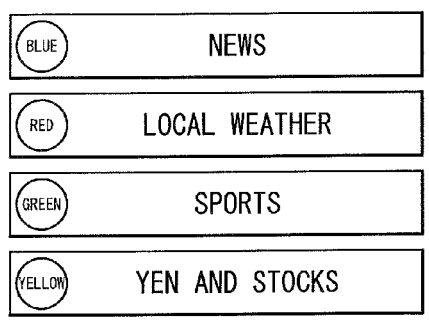
FIGS. 5A and 5B are illustrations of display examples on the display device and the mobile device illustrated in FIG. 1.
Figure 5B:
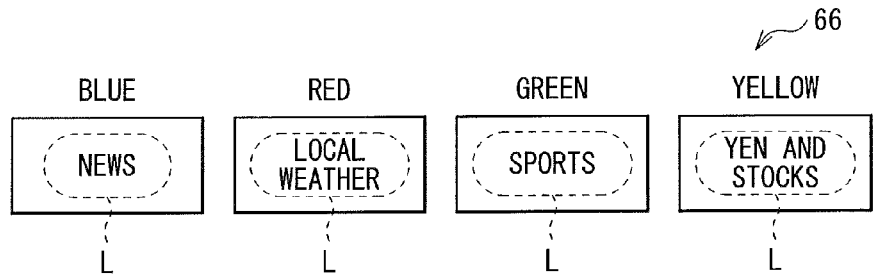

FIGS. 5A and 5B illustrate a display example on the display device 10 and a display example on the mobile device 20, respectively, in the case where data broadcasting is received. In the case where data broadcasting is received, functions are allocated to the color buttons of the remote control, respectively, and when a user touches the data broadcasting button 65, for example, as illustrated in FIG. 5A, information associated with the functions allocated to the color buttons is displayed on the display section 12 of the display device 10. Moreover, in the display system 1, when the display device 10 receives data broadcasting, information associated with the allocated functions is transmitted to the mobile device 20, and labels L as illustrated in FIG. 5B are displayed on the color button section 66 in the display screen 60 of the mobile device 20 illustrated in FIG. 4. Therefore, the user is allowed to operate these functions by watching only the display screen 60 of the mobile device 20 without watching the display screen of the display device 10.

Figure 6:
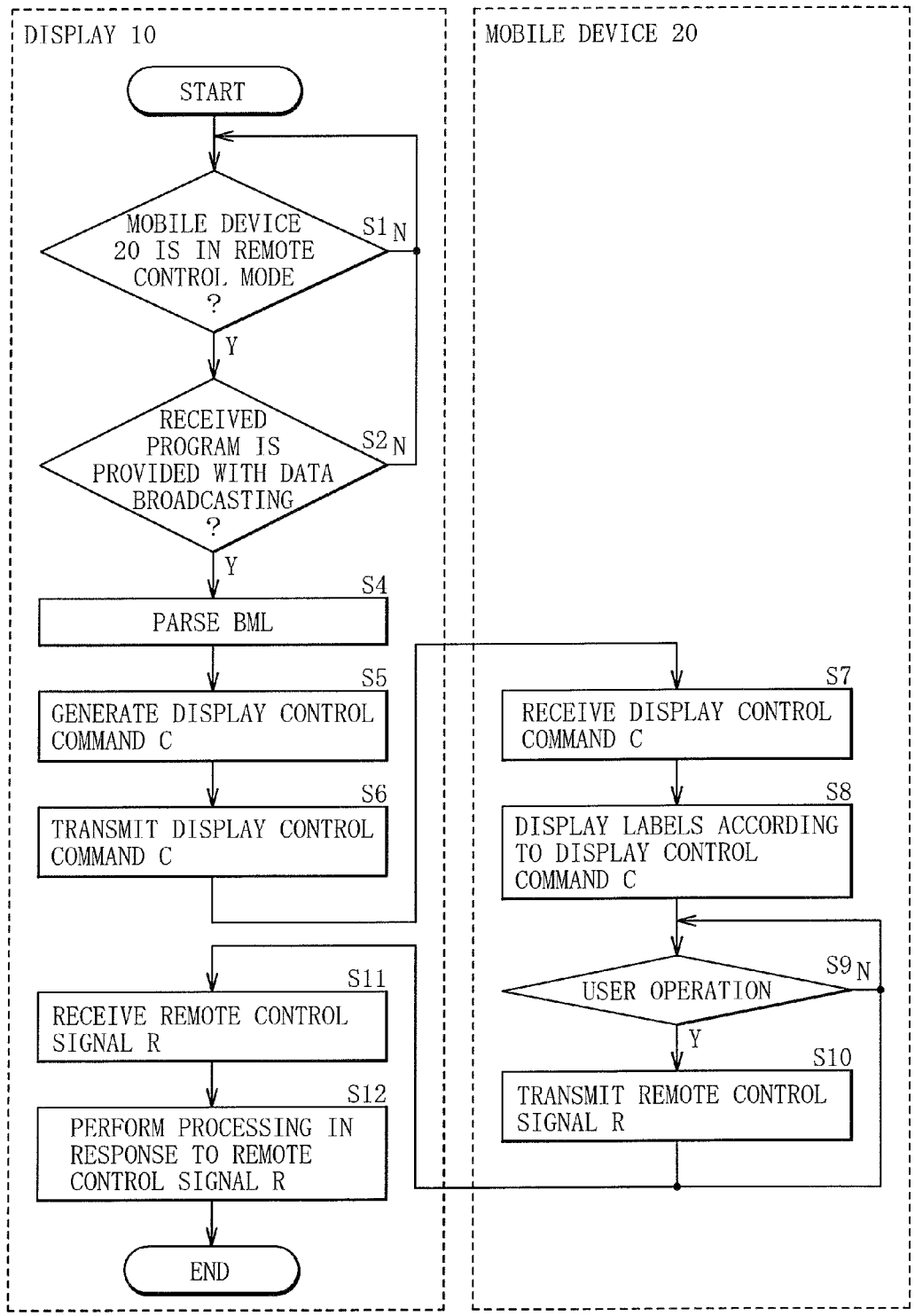
FIG. 6 is a flow chart illustrating an operation example of the display system illustrated in FIG. 1.

FIG. 6 illustrates an operation flow of the display system 1. In the display system 1, when the display device 10 receives data broadcasting, the display device 10 generates the display control command C for performing display control of the color button section 66 based on information associated with data broadcasting to transmit the display control command C to the mobile device 20. In the mobile device 20, display control of the operation buttons is performed according to the display control command C. More specific description will be given below.

First, the display device 10 checks whether the mobile device 20 is in a remote control mode through the communication mechanism A (step S1). In the case where the mobile device 20 is in the remote control mode, the operation flow proceeds to step S2, and in the case where the mobile device 20 is not in the remote control mode, the operation flow returns to the step S1.

Next, the display device 10 checks whether a received program is provided with data broadcasting (step S2). In the case where the received program is provided with data broadcasting, the operation flow proceeds to step S4, and in the case where the received program is not provided with data broadcasting, the operation flow returns to the step S1.

In the case where the received program is provided with data broadcasting, when a user touches the data broadcasting button 65 in the following steps, the display device 10 displays data broadcasting. More specifically, in the mobile device 20, first, the control section 24 generates the remote control signal R in response to a user's operation, and the wireless communication section 23 transmits the remote control signal R to the display device 10. In the display device 10, the network interface 54 receives the remote control signal R through the wireless communication section 55, and the CPU 51 analyzes the remote control signal R. Then, the demultiplexer 32 separates a data broadcasting signal from the MPEG-TS stream in response to an instruction from the CPU 51, and supplies information associated with data broadcasting to the graphic generation section 35 through the internal bus 39. Then, the graphic generation section 35 generates a screen for data broadcasting based on the information, and the display section 12 displays the screen.

Next, the display device 10 parses BML in data broadcasting (step S4) to generate the display control command C (step S5). More specifically, the command generation module 51M of the CPU 51 analyzes BML in data broadcasting, and generates the display control command C based on an analysis result.

FIG. 7 illustrates an example of the display control command C. The display control command C is written in BML. In this example, labels L of "news", "local weather", "sports", "yen and stocks" are written in parts corresponding to tags of <blue>, <red>, <green> and <yellow>, respectively. In this case, these labels L correspond to specific examples of "button information" in the technology.

Next, the display device 10 transmits the display control command C to the mobile device 20 (step S6). More specifically, the network interface 54 of the display device transmits the display control command C to the mobile device 20 with use of the communication mechanism A through the wireless communication section 55.

Next, the mobile device 20 receives the display control command C (step S7). More specifically, the wireless communication section 23 of the mobile device 20 receives the display control command C transmitted from the display device 10.

Next, the mobile device 20 displays the labels L according to the display control command C (step S8). More specifically, first, the command analysis section 26 of the mobile device 20 analyzes the received display control command C to perform display control of the color button section 66 based on an analysis result. In other words, in an example of the display control command C illustrated in FIG. 7, for example, the labels L of "news" and "local weather" written in the parts corresponding to the tag <blue> and <red> are displayed on blue and red buttons, respectively, as illustrated in FIG. 5B. Moreover, the labels L of "sports" and "yen and stocks" written in the parts corresponding to the tag <green> and <yellow> are displayed on green and yellow buttons, respectively, as illustrated in FIG. 5B.

Next, the mobile device 20 receives a user operation (step S9). More specifically, when the user touches a part corresponding to any one of the operation buttons of the display section 21, the touch panel 22 detects a touch by the user. In the case where the user operation is performed, the operation flow proceeds to step S10, and in the case where the user operation is not performed, the operation flow returns to the step S9.

Then, the mobile device 20 transmits the remote control signal R (step S10). More specifically, the control section 24 of the mobile device 20 generates the remote control signal R in response to the user operation performed in the step S9, and the wireless communication section 23 transmits the remote control signal R to the display device 10 with use of the communication mechanism A. After that, the mobile device 20 returns to the step S9, and waits for a next user operation.

Next, the display device 10 receives the remote control signal R (step S11). More specifically, the network interface 54 of the display device 10 receives the remote control signal R transmitted from the mobile device 20 through the wireless communication section 55.

Then, the display device 10 performs processing in response to the remote control signal R (step S12). More specifically, the CPU 51 of the display device 10 analyzes the remote control signal R to control the display device 10 based on an analysis result.

Thus, the operation flow is completed.

[Effects]

As described above, in the embodiment, the labels are displayed on the mobile device in a hand of the user; therefore, the display device is allowed to be operated by watching only the mobile device without checking the display screen of the display device.

Moreover, in the embodiment, the operation buttons of a remote control are displayed and operated on the mobile device; therefore, compared to the case where a menu screen associated with a large number of functions is switched and displayed, the screen is allowed to be simplified, and is easy for the user to follow.

Further, in the embodiment, the display control command is written in the same description language as that in data broadcasting; therefore, a method of generating the display control command is allowed to be simplified.

Moreover, in the embodiment, the mobile device is used as a remote control; therefore, a dedicated remote control is not necessary, and the number of remote controls which typically tends to be increased is allowed to be reduced, thereby reducing effort for managing the remote controls.

[Modification 1]

Figure 8:
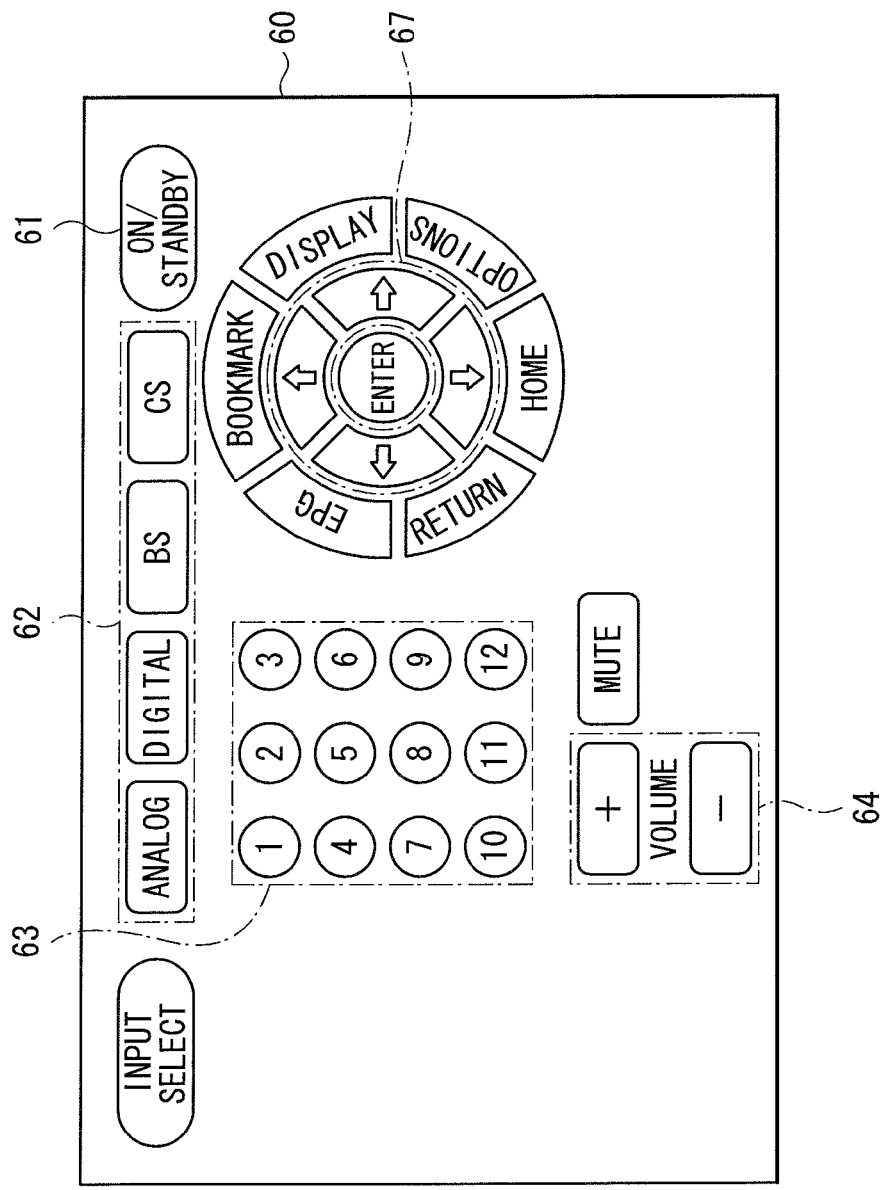
FIG. 8 is a diagram illustrating an example of a display screen of a mobile device according to a modification of the first embodiment.

In the above-described embodiment, in the case where a received program is provided with data broadcasting, the display control command C is transmitted to the mobile device 20; however, the technology is not limited thereto, and even in the case where the received program is not provided with data broadcasting, the display control command C may be transmitted to the mobile device 20. For example, in the case where the received program is not provided with data broadcasting, the display control command C indicating so is transmitted, thereby allowing the data broadcasting button 65 and the color button section 66 illustrated in FIG. 4 not to be displayed as illustrated in FIG. 8. In other words, an easy-to-follow operation for the user is achievable by not displaying an inoperable button.

[Other Modification]

In the above-described embodiment, in the mobile device 20, the labels L are displayed on the color button section 66 irrespective of whether the user touches the data broadcasting button 65; however, the technology is not limited thereto. For example, only in the case where the user touches the data broadcasting button 65 to display data broadcasting on the display device 10, the labels L may be displayed on the color button section 66 of the mobile device 20.

(2. Second Embodiment)

Next, a display system 2 according to a second embodiment of the technology will be described below. In the embodiment, the display control command C is generated in response to connection of an external device to the display device 10. It is to be noted that like components are denoted by like numerals as of the display system 1 according to the first embodiment and will not be further described.

Figure 9:
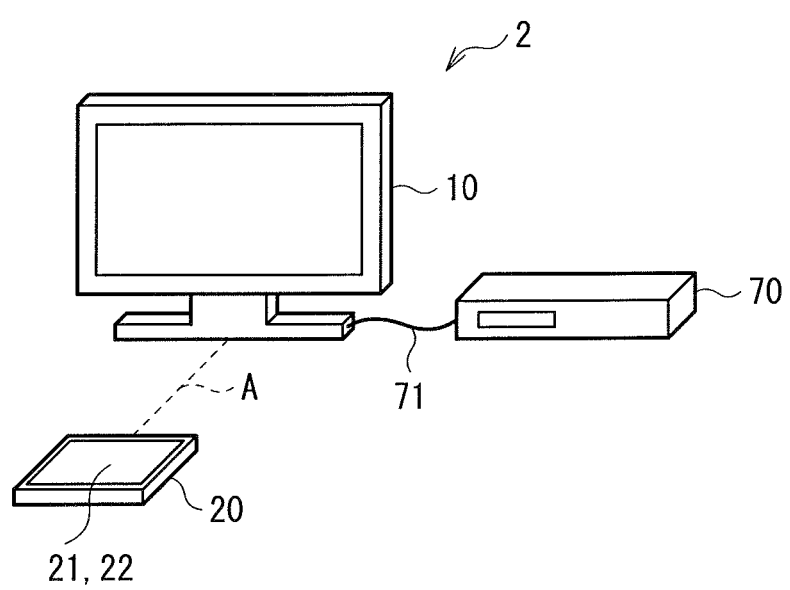
FIG. 9 is a configuration diagram illustrating a configuration example of a display system according to a second embodiment of the technology.

FIG. 9 illustrates a configuration example of the display system 2. The display system 2 includes an external device 70. In this example, the external device 70 is a recording/playback device such as a BD recorder, and is connected to an HDMI terminal TH of the display device 10 through an HDMI cable 71. In other words, the display device 10 and the external device 70 are connected to each other through a link function by HDMI-CEC (High Definition Multimedia Interface-Consumer Electronics Control), and are allowed to perform operations linked to each other. In this example, the display device 10 is a master, and controls all external devices connected to the display device 10, and exchanges a CEC control signal with the external devices; therefore, the display device 10 and the external devices are allowed to mutually control operations.

Figure 10:
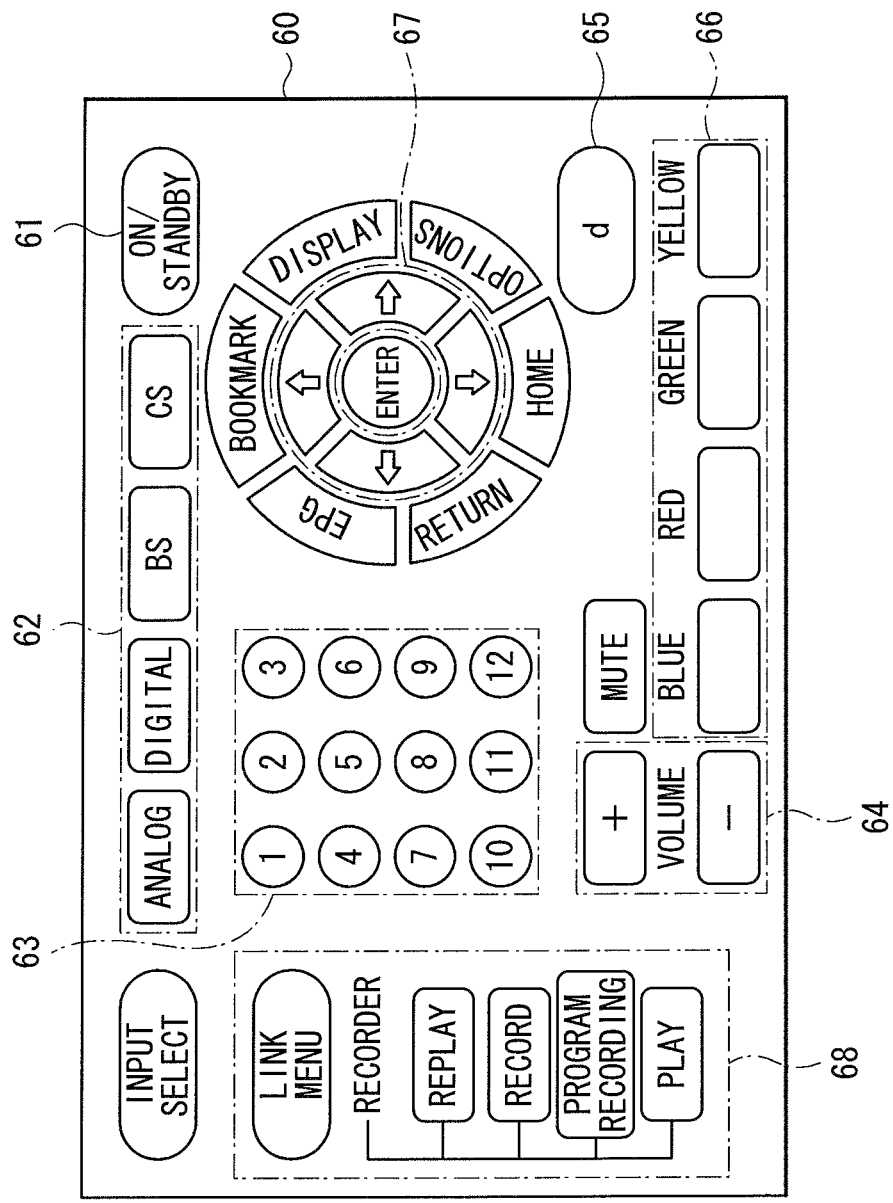
FIG. 10 is a diagram illustrating an example of a display screen of a mobile device illustrated in FIG. 9.

FIG. 10 illustrates an example of a display screen of the mobile device 20 in a remote control mode. In the case where the external device 70 is connected to the display device 10, for example, as illustrated in FIG. 10, the mobile device 20 displays an external device button section 68 for operating the external device 70. In the display system 2, when the external device 70 is connected to the display device 10, information associated with the external device 70 is transmitted to the mobile device 20, and as illustrated in FIG. 10, the external device button section 68 is displayed on the display screen 60 of the mobile device 20.

Figure 11:
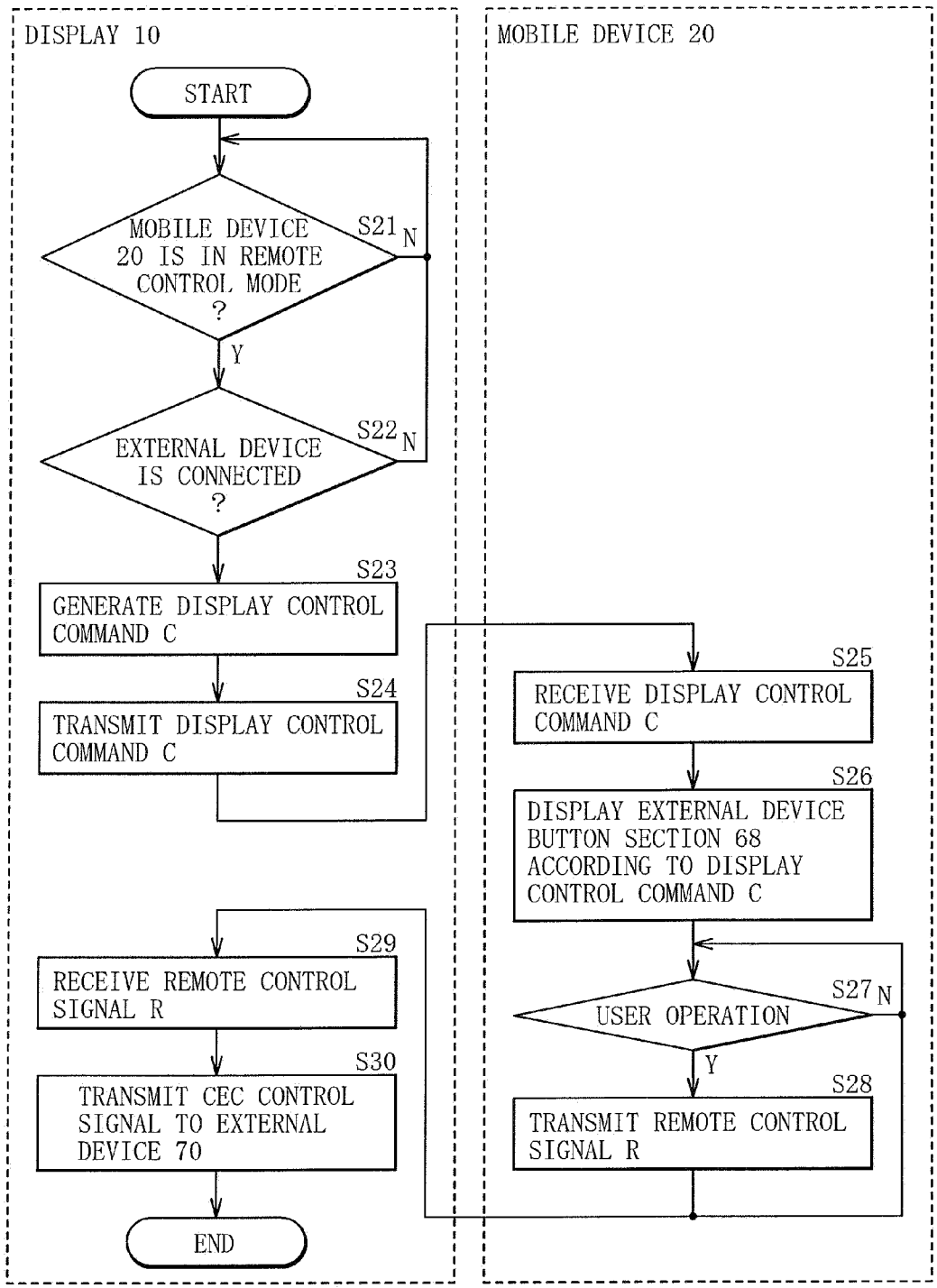
FIG. 11 is a flow chart illustrating an operation example of the display system illustrated in FIG. 9.

FIG. 11 illustrates an operation flow of the display system 2. In the display system 2, when the external device 70 is connected to the display device 10, the display device 10 generates and transmits the display control command C for performing display control of the external device button section 68 to the mobile device 20. The mobile device 20 displays the external device button section 68 according to the display control command C. Specific description will be given below.

First, the display device 10 checks whether the mobile device 20 is in a remote control mode with use of the communication mechanism A (step S21). In the case where the mobile device 20 is in the remote control mode, the operation flow proceeds to step S22, and in the case where the mobile device 20 is not in the remote control mode, the operation flow returns to the step S21.

Next, the display device 10 checks whether the external device 70 is connected to the HDMI terminal TH (step S22). In the case where the external device 70 is connected to the HDMI terminal TH, the operation flow proceeds to step S23, and in the case where the external device 70 is not connected to the HDMI terminal TH, the operation flow returns to the step S21.

Then, the display device 10 generates the display control command C (step S23). More specifically, the command generation module 51M of the CPU 51 generates the display control command C based on the kind or the like of the external device 70 connected to the display device 10.

FIG. 12 illustrates an example of the display control command C in the embodiment. The display control command C is written in BML as in the case of the first embodiment. In this example, for example, text in parts indicated by W1, W2, W3, W4 and W5 correspond to a "link menu" button, a "replay" button, a "record" button, a "program recording" button and a "play" button of the external device button section 68 illustrated in FIG. 10, respectively. The labels L are written in respective parts W1 to W5, and the labels L are displayed as buttons in the external device button section 68 as illustrated in FIG. 10.

Next, the display device 10 transmits the display control command C to the mobile device 20 (step S24), and the mobile device 20 receives the display control command C (step S25). Specific operations in the steps S24 and S25 are similar to those in the step S6 and S7 in the first embodiment.

Then, the mobile device 20 displays the external device button section 68 according to the display control command C (step S26). More specifically, first, the command analysis section 26 of the mobile device 20 analyzes the received display control command C to perform display control of the external device button section 68 based on an analysis result.

Next, the mobile device 20 receives a user operation (step S27), and transmits the remote control signal R according to the operation (step S28). Then, the display device 10 receives the remote control signal R (step S29). Specific operations in the steps S27 to S29 are similar to those in the step S9 to S11 in the first embodiment.

Next, the display device 10 transmits the CEC control signal to the external device 70 (step S30). More specifically, the CPU 51 of the display device 10 analyzes the received remote control signal R to generate the CEC control signal based on an analysis result, and then transmits the CEC control signal to the external device 70 through the HDMI interface 37. In the external device 70, processing is performed in response to the CEC control signal.

Thus, the operation flow is completed.

[Effects]

As described above, in the embodiment, display control of operation buttons on the mobile device is performed in response to connection of the external device to the display device; therefore, the operation buttons are displayed only in the case where the external device is connected to the display device, thereby allowing an operable button to be displayed and allowing an inoperable button not to be displayed, and an operation which is easy for a user to follow is achievable.

Other effects are similar to those in the first embodiment.

[Modification 2]

In the above-described embodiment, display control of the external device button section 68 is performed in response to connection of the external device 70 to the display device 10; however, the technology is not limited thereto, and instead of the external device button section 68, display control of any other operation button may be performed. An example in the case where display control of a cursor button section 67 is performed in response to connection of the external device 70 to the display device 10 will be described below.

Figure 13:
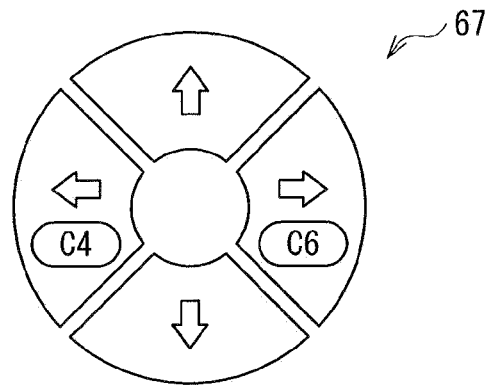
FIG. 13 is a diagram illustrating a display example on a mobile device according to a modification of the second embodiment.

FIG. 13 illustrates a display example of the cursor button section 67. In this example, in the case where a recording/playback device is connected as the external device 70, operations of forwarding and reversing the chapter number of contents to be played are allocated to right and left buttons. More specifically, in the case where a chapter assigned to Chapter No. 5 is played at present, as illustrated in FIG. 13, "C6" representing the next chapter is displayed on the right button, and "C4" representing the previous chapter is displayed on the left button. At this time, when the right button is touched, the mobile device 20 transmits, to the display device 10, the remote control signal R for skipping to the next chapter, and when the left button is touched, the mobile device 20 transmits, to the display device 10, the remote control signal R for skipping to the previous chapter.

For example, display relating to the operation illustrated in FIG. 13 may be performed by transmitting the display control command C from the display device 10 to the mobile device 20 in the case where the external device 70 is connected to the display device 10, or in the case where the dispaly 10 is ready to play contents.

Thus, when display relating the operation is performed on the mobile device 20 in a hand of the user, the user is allowed to operate the display device 10 only by watching the mobile device 20 without checking the display screen of the display device 10. Moreover, for example, in the case where such display is performed only on the mobile device 20 and such display is not performed on the display screen of the display device 10, the user is allowed to watch contents on the display device 10 without being interrupted by display of the operation.

[Other Modification]

In the above-described embodiment, the external device is a recording/playback device; however, the technology is not limited thereto, and the external device may be any other device such as a playback-only device or an amplifier. In this case, the external device button section 68 desirably displays a button corresponding to the external device.

Moreover, in the above-described embodiment, one external device is connected; however, the technology is not limited thereto, and, for example, a plurality of external devices may be connected. In this case, a plurality of external device button sections corresponding to the plurality of connected external devices may be displayed, or an external device button section corresponding to one selected external device may be displayed.

Further, in the above-described embodiment, the external device is connected through HDMI; however, the technology is not limited thereto, and the external device may be connected through any other interface having a function similar to that of HDMI.

Although the present technology is described referring to the embodiments and the modifications, the technology is not limited thereto, and may be variously modified.

For example, functions of the display systems 1 and 2 according to the first and second embodiments may be combined. More specifically, for example, a display system may be configured to perform display control of the color button section 66 and the external device button section 68 on the mobile device 20 in response to reception of data broadcasting and connection of an external device, respectively.

For example, in the above-described embodiments, display control of operation buttons on the mobile device 20 is performed in response to reception of data broadcasting (the first embodiment) and connection of the external device (the second embodiment); however, the technology is not limited thereto. Some examples will be described below.

Figure 14A:
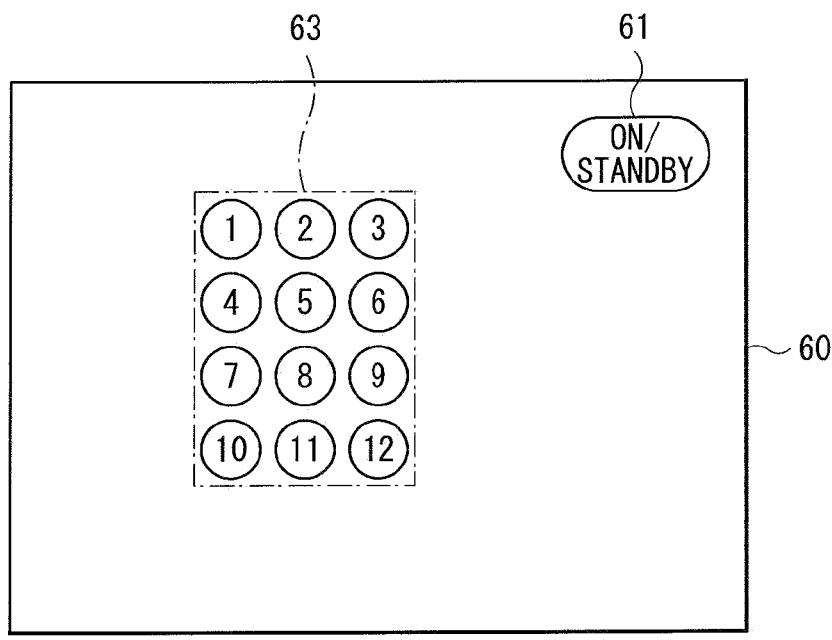
FIGS. 14A and 14B are diagrams illustrating display examples on the mobile device according to the modification.

FIG. 14A illustrates an example of a display screen of the mobile device 20 in the case where the display device 10 is turned off. In this example, only the on/standby button 61 and the number button section 63 are displayed on the display screen 60. Then, when one of displayed operation buttons is touched, the display device 10 is turned on. More specifically, when the on/standby button 61 is touched in the case where the display device 10 is off, the mobile device 20 transmits, to the display device 10, the remote control signal R for allowing the display device 10 to be turned on.

Moreover, when the number button section 63 is touched in the case where the display device 10 is off, the mobile device 20 transmits, to the display device 10, the remote control signal R for allowing the display device 10 to be turned on and selecting a channel corresponding to a touched number button.

Display relating to operations illustrated in FIG. 14A is allowed to be performed by transmitting the display control command C from the display device 10 to the mobile device 20 in the case where the display device 10 is switched from an ON state to an OFF state.

Figure 14B:
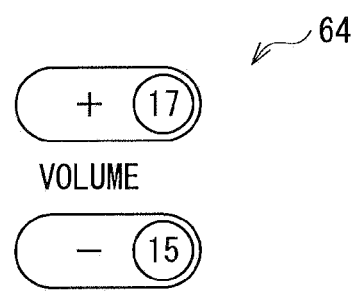

FIG. 14B illustrates a display example of the volume button section 64. In this example, in the case where the present volume is "16", "17" representing one level higher than the present volume is displayed on a + button, and "15" representing one level lower than the present volume is displayed on a − button. At this time, when the + button is touched, the mobile device 20 transmits, to the display device 10, the remote control signal R for increasing the volume by one level, and when the − button is touched, the mobile device 20 transmits, to the display device 10, the remote control signal R for decreasing the volume by one level.

Display relating to the operation illustrated in FIG. 14B is allowed to be performed by transmitting the display control command C from the display device 10 to the mobile device 20 when the volume of the display device 10 is changed. In this case, the mobile device 20 may perform such display only during a predetermined period from reception of the display control command C, or may perform such display regularly.

Figure 15:
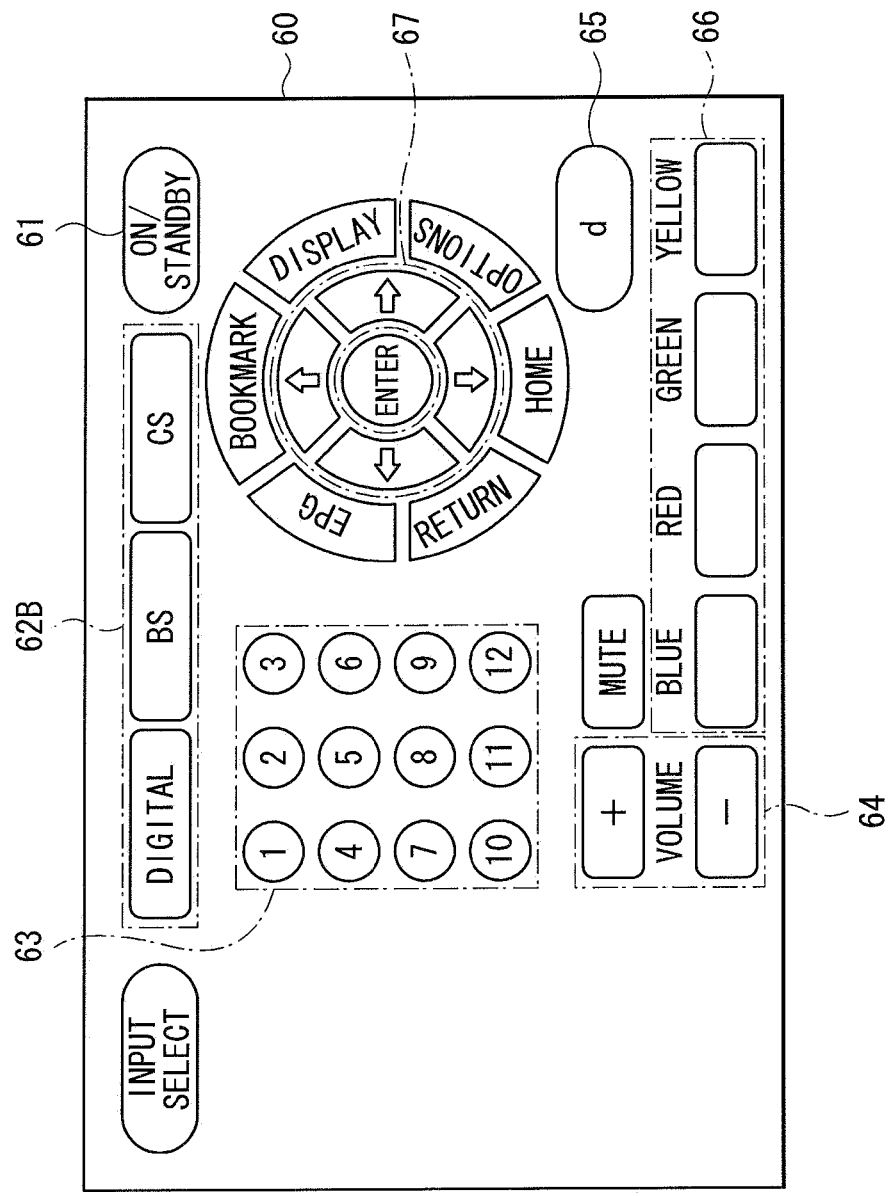
FIG. 15 is a diagram illustrating an example of a display screen of a mobile device according to another modification.

For example, in the above-described embodiments, display control of operation buttons is performed without changing the positions of the operation buttons; however, the technology is not limited thereto, and the positions of the operation buttons may be changed. FIG. 15 illustrates an example in the case where the positions of respective buttons in a broadcast select button section 62B are changed. The broadcast select button section 62 illustrated in FIG. 4 includes four operation buttons "analog", "digital", "BS" and "CS"; however, the broadcast select button section 62B illustrated in FIG. 15 includes three operation buttons "digital", "BS" and "CS", and the positions of these operation buttons are changed. In other words, when the "analog" button is not necessary by transition from analog terrestrial broadcasting to digital terrestrial broadcasting, the "analog" button is not displayed, and the positions of the other three operation buttons are changed.

Thus, when display control is performed to change the positions of the operation buttons in such a manner, a display region is allowed to be used effectively. In particular, in the example illustrated in FIG. 15, the positions of the operation buttons are permanently changed by a change in standards, and unlike a temporary change in positions, the user is less likely to be confused, and only operable operation buttons are displayed and the operation buttons are upsized; therefore, the broadcast select button section 62B is more easily used by the user.

For example, in the above-described embodiments, data broadcasting is written in BML; however, the technology is not limited thereto. For example, data broadcasting may be written in a language based on a platform for data broadcasting such as MHP (Multimedia Home Platform), OCAP (Open Cable Application Platform) or ACAP (Advanced Common Application Platform). In this case, the description language of the display control command C is allowed to be the same as that of the data broadcasting.

For example, in the above-described embodiments, the display system is configured of the display device 10 and the mobile device 20; however, the technology is not limited thereto. For example, instead of the mobile device 20, the display system may be configured with use of a remote control dedicated to the display device 10.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile device comprising:
a control unit configured to control display, on a display screen of the mobile device, of at least one operation button to control an electronic device external to the mobile device, in accordance with analysis by the control unit of a display control command indicated in button information associated with the at least one operation button and received by the mobile device,
wherein the at least one operation button is displayed after said electronic device is connected, directly or indirectly, to said mobile device,
wherein at least one different operation button is displayed if a different type of external device is connected, directly or indirectly, to said mobile device, and
wherein a remote control signal is transmitted wirelessly by the mobile device when said at least one operation button is activated.

2. The mobile device of claim 1, wherein the display of the at least one operation button on the display screen is in accordance with the button information associated with the at least one operation button received by the mobile device when the mobile device is in remote control mode.

3. The mobile device of claim 1, wherein the button information associated with the at least one operation button is received by the mobile device when data broadcasting for a program is provided.

4. The mobile device of claim 1, wherein the button information associated with the at least one operation button is received by the mobile device when the electronic device is connected to the mobile device.

5. The mobile device of claim 1, wherein the button information associated with the at least one operation button received by the mobile device is written in a same language that button information in data broadcasting is written.

6. The mobile device of claim 5, wherein the language in which the data broadcasting is written is a language among a plurality of languages in which the data broadcasting is writable.

7. The mobile device of claim 1, wherein, when data broadcasting for a program is absent, the button information associated with the at least one operation button received by the mobile device reflects the data broadcasting being absent.

8. The mobile device of claim 1, wherein the button information associated with the at least one operation button received by the mobile device is generated from information in data broadcasting for a program.

9. The mobile device of claim 1, wherein the button information associated with the at least one operation button received by the mobile device includes information to control display on the display screen of the mobile device such that a first operation button is displayed on the display screen of the mobile device only when a second operation button on the display screen of the mobile device is selected.

10. The mobile device of claim 1, wherein the button information associated with the at least one operation button received by the mobile device includes information to control display on the display screen of the mobile device such that, when the at least one operation button is displayed, display on another display screen is controlled to display contents associated with the at least one operation button without information corresponding to the at least one operation button.

11. The mobile device of claim 1, wherein the button information associated with the at least one operation button received by the mobile device includes information to control display on the display screen of the mobile device of the at least one operation button to reflect a predetermined broadcast standard.

12. The mobile device of claim 1, wherein the button information associated with the at least one operation button received by the mobile device includes information to control display on the display screen of the mobile device of the at least one operation button to reflect only operable operation buttons.

13. The mobile device of claim 1, wherein the control unit is configured to control display on the display screen of the mobile device of a label based on the button information associated with the at least one operation button received by the mobile device.

14. The mobile device of claim 1 further comprising:
a touch panel superimposed on the display screen of the mobile device.

15. The mobile device of claim 1, wherein the control unit is configured to control display on the display screen of the mobile device of indicia representing a next chapter and a previous chapter of content based on the button information associated with the at least one operation button received by the mobile device.

16. The mobile device of claim 15, wherein the content is from the electronic device or the different type of external device.

17. The mobile device of claim 1, wherein the control unit is configured to control display on the display screen of the mobile device to indicate an operating state of the electronic device or the different type of external device.

18. The mobile device of claim 1, wherein the control unit is configured to control display on the display screen of the mobile device when the button information associated with the at least one operation button received by the mobile device indicates volume of the electronic device is changed.

19. The mobile device of claim 1,
wherein the at least one operation button is displayed after the mobile device is determined to be in remote control mode.

20. A method of operating a mobile device, the method comprising:
controlling, by a processor, display, on a display screen of the mobile device, of at least one operation button to control an electronic device external to the mobile device, in accordance with analysis by the processor of a display control command indicated in button information associated with the at least one operation button and received by the mobile device,
wherein the at least one operation button is displayed after said electronic device is connected, directly or indirectly, to said mobile device,
wherein at least one different operation button is displayed if a different type of external device is connected, directly or indirectly, to said mobile device, and wherein a remote control signal is transmitted wirelessly by the mobile device when said at least one operation button is activated.

21. A system comprising:

a mobile device and an electronic device external to the mobile device, wherein the mobile device includes a first control unit configured to control display, on a display screen of the mobile device, of at least one operation button to control the electronic device, in accordance with analysis by the first control unit of a display control command indicated in button information associated with the at least one operation button and received by the mobile device, wherein the at least one operation button is displayed after said electronic device is connected, directly or indirectly, to said mobile device, wherein at least one different operation button is displayed if a different type of external device is connected, directly or indirectly, to said mobile device, wherein a remote control signal is transmitted wirelessly by the mobile device when said at least one operation button is activated, and wherein the electronic device includes a second control unit to control display, on another display screen, of content associated with the at least one operation button.

* * * * *